Sept. 30, 1952 E. A. A. AXELSON ET AL Re. 23,551

PAINT PRESSURE BOX WITH HEAT EXCHANGER

Original Filed May 3, 1945

INVENTORS
E.A.A. AXELSON &
C.A. LOFGREN
BY: Haseltine, Lake & Co
AGENTS

Reissued Sept. 30, 1952 Re. 23,551

UNITED STATES PATENT OFFICE 23,551

PAINT PRESSURE BOX WITH HEAT EXCHANGER

Eskil Anders August Axelson and Carl Åke Löfgren, Stockholm, Sweden, assignors to Svenska Maskinaktiebolaget Greiff, Stockholm, Sweden, a joint-stock company of Sweden Original No. 2,499,447, dated March 7, 1950, Serial No. 591,814, May 3, 1945. Application for reissue March 5, 1951, Serial No. 213,990. In Sweden January 18, 1945

1 Claim. (Cl. 299—89)

Figures 1, 2:
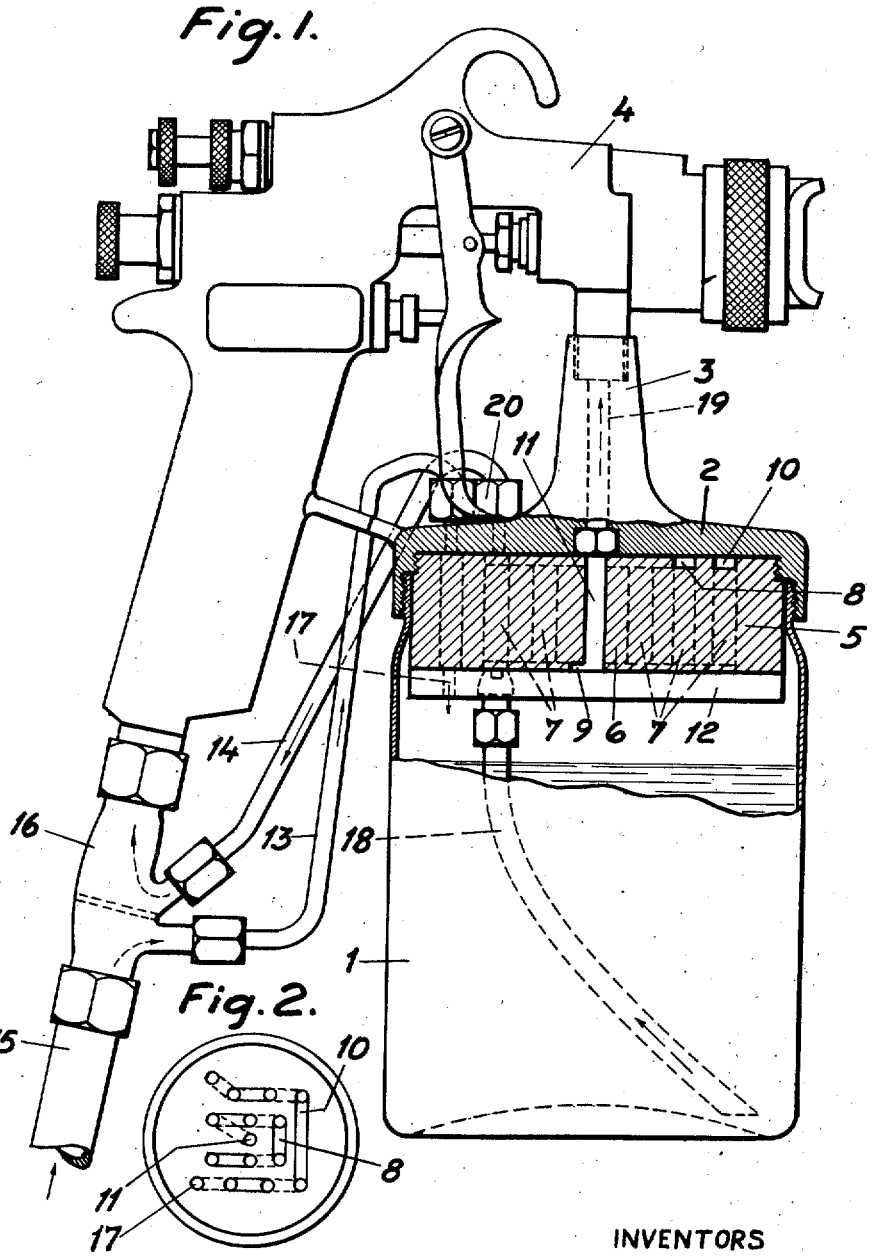

Matter enclosed in heavy brackets [ ] appears in the original patent but forms no part of this reissue specification; matter printed in italics indicates the additions made by reissue.

It is known in spray pistols to heat the paint supplied to the spray pistol in a paint pressure box attached to the pistol or in a container. However, in this case the paint has been heated by means of a heating coil or the like located around or within the container, and the paint pressure box respectively, and passed by heated air.

Yet, such a device is connected with the great drawback that after each filling the whole quantity of paint in the container, and in the paint pressure box respectively, must be heated to the suitable temperature before the spraying can begin—which involves much loss of time. Further, it is difficult to maintain the paint at the same temperature all the time because the temperature of the paint will rise according as the quantity of the paint decreases. Consequently, the painting becomes different according to the temperature of the paint.

According to the present invention this drawback is eliminated by the paint pressure box or container being provided with a heat exchanger provided within or outside the same, one channel system of the said heat exchanger being connected to a source for heated compressed air, the other channel system of the heat exchanger being connected to the spray pistol and to the paint receiving portion of the paint pressure box.

The invention is illustrated in the accompanying drawing in which Figure 1 is a side view partly in section of a spray pistol and attached paint pressure box and Figure 2 is a top plan view drawn to a smaller scale of the heat exchanger seen with the closure removed.

In the drawing the reference numeral 1 indicates the paint pressure box, 2 its cover which by a connection piece 3 is screwed on to the spray pistol 4. Into the cover there is screwed a heat exchanger 5. In a preferred embodiment the heat exchanger consists of a heat exchange body 6, preferably of a light material with good heat conductability. In the body 6 there is a number of longitudinal channels 7 which through recesses 8, 9 at the ends are connected with one another to form two separate channel systems 10 and 11, preferably with two or more parallel branches. The recesses are made in such a way that they have a smaller flow area than the rest of the channel systems. The body 6 is screwed on to the cover 2 of the paint pressure box 1 so that said cover completes the channels formed by the recesses 8. To the underside of the body 6 there is screwed a cover plate 12 completing the channels formed by the recesses 9.

One channel system 10 of the heat exchanger 5 is by means of pipes 13, 14 connected with a hot compressed air source 15 as well as with the compressed air inlet 16 of the spray pistol 4, and moreover, by a channel 17 or a reducing valve (not shown) in the cover plate 12, to the interior of the paint pressure box.

The other channel system 11 of the heat exchanger 5 communicates with a pipe 18 extending to the vicinity of the bottom of the paint pressure box as well as with a channel 19 provided in the connection piece 3 of the cover, the said channel communicating with the paint channel (not shown) of the spray pistol.

Having now described our invention, what we claim as new and desire to secure by Letters Patent is:

[1. A paint pressure box for spray pistols comprising a paint container, a closure therefor, a heat exchanger located in the upper portion of said container and consisting of a metal block having two series of parallel channels therein, means for flowing hot compressed air through one of said channel series, a connection from the lower portion of said paint container to the other of said channel series, and means for flowing hot compressed air into said paint container to force paint through said paint connection into said other channel series in heat exchange relation with the hot air flowing in said first mentioned channel series.]

[2. The combination, with a spray gun and a paint pressure box, of a heat exchanger comprising a first channel system communicating with a source of hot compressed gas and with the gun, a second dispensing channel system communicating with the lower part of the box and with the gun, means for introducing compressed gas to the interior of the pressure box, the two channel systems being of substantial length and in intimate heat exchange relationship, and means for transferring the hot compressed gas from said first channel system after the hot gas passes therethrough, to said gun for atomizing the heated paint.]

[3. The combination claimed in claim 2 wherein the means for introducing compressed gas to the box comprises a channel independent of the first and second channel systems and communicating with the first channel system and with the top of the box.]

[4. A paint pressure box for spray guns having a heat exchanger associated therewith, said heat exchanger comprising a first channel system connected between a source for hot compressed gas and a spray gun and which also communicates with the interior of the pressure box, a second dispensing channel system in heat exchange relationship with the first channel system and connected between the lower portion of the pressure box and the spray gun, the cross-sections of the channel systems and of the interior of the box being so proportioned that the major part of the gas flows through the first channel system and only a minor part enters the box, and means for transferring the hot compressed gas from said first channel system after the hot gas passes therethrough, to said gun for atomizing the heated paint.]

[5. A paint pressure box as claimed in claim 4, wherein the heat exchanger comprises a body having parallel channels running therethrough and recesses at the ends of the body connecting the channels in groups to form two separate channel systems each with two or more parallel branches.]

[6. In combination with a paint pressure box for spray guns, a heat exchanger comprising a first channel system communicating with a source of hot compressed gas and with the spray gun, a second dispensing channel system communicating with the lower part of the box and with the spray gun, the two channel systems being of substantial length and in intimate heat exchange relationship, means for introducing compressed gas to the interior of the pressure box, and means for transferring the hot compressed gas from said first channel system after the hot gas passes therethrough, to said gun for atomizing the heated paint.]

[7. The combination claimed in claim 6 wherein the means for introducing compressed gas to the box comprises a channel independent of the first and second channel systems and communicating with the first channel system and with the top of the box.]

[8. The combination as claimed in claim 2, wherein the heat exchanger comprises a heat exchange body having parallel channels therein through which recesses at the ends are connected with one another to form two channel systems with two or more parallel branches.]

[9. The combination as claimed in claim 8 wherein the recesses have a smaller flow area than the rest of the channel systems.]

*10. The combination with a spray gun, a paint feeding line and a paint source which is in communication with a pressure source, of a heat exchanger comprising a first channel system remote from the paint in the paint source and intermediate the paint feeding line and the gun and communicating with a source of hot compressed gas and with the gun, a second dispensing channel system communicating with the paint feeding line and with the gun, the two channel systems being of substantial length to transfer the necessary heat, and in intimate heat exchange relationship, and means for transferring the hot compressed gas from said first channel system, after the hot gas passes therethrough, to said gun for atomizing the heated paint.*

ESKIL ANDERS AUGUST AXELSON.
CARL ÅKE LÖFGREN.

REFERENCES CITED

The following references are of record in the file of this patent or the original patent:

UNITED STATES PATENTS

| Number | Name | Date |
|---|---|---|
| 1,052,002 | Kent | Feb. 4, 1913 |
| 1,587,736 | Schenck | June 8, 1926 |
| 1,644,081 | Prebel | Oct. 4, 1927 |
| 1,737,347 | Wilson | Nov. 26, 1929 |
| 1,998,776 | Collins | Apr. 23, 1935 |
| 2,071,218 | Reid | Feb. 16, 1937 |
| 2,114,661 | West | Apr. 19, 1938 |
| 2,148,986 | Hoyt | Feb. 28, 1939 |

FOREIGN PATENTS

| Number | Country | Date |
|---|---|---|
| 590,894 | Germany | Jan. 15, 1934 |